United States Patent [19]
Canfield, Jr.

[11] Patent Number: 6,148,963
[45] Date of Patent: Nov. 21, 2000

[54] WHEELBARROW HAVING A HANDBRAKE

[76] Inventor: B. Earl Canfield, Jr., 151 Hickory La., Bethlehem, Conn. 06751-2311

[21] Appl. No.: 09/270,851

[22] Filed: Mar. 17, 1999

Related U.S. Application Data

[60] Provisional application No. 60/077,012, Mar. 6, 1998.

[51] Int. Cl.⁷ .................................................. B62L 3/00
[52] U.S. Cl. ...................... 188/24.21; 188/2 D; 280/47.31
[58] Field of Search .............................. 188/24.21, 24.12, 188/24.22, 19, 22, 2 D, 24.18; 280/653, 47.3, 47.31

[56] References Cited

U.S. PATENT DOCUMENTS

| | | | |
|---|---|---|---|
| 2,716,031 | 8/1955 | Roessler | 280/47.31 |
| 3,950,005 | 4/1976 | Patterson | 280/47.31 |
| 4,479,658 | 10/1984 | Michaux | 280/47.31 |
| 4,640,520 | 2/1987 | Wing et al. | 280/47.31 |

*Primary Examiner*—Robert Oberleitner
*Assistant Examiner*—Pamela J. Lipka
*Attorney, Agent, or Firm*—Dallett Hoopes

[57] ABSTRACT

Handbrake assembly for the wheelbarrow is normally "on" and comprises a brake lever pivoted to the wheelbarrow undercarriage. One end of the lever carries a shoe head, the other a fixture for the drive cable of a Bowden wire leading to a bicycle-type handbrake. A spring presses the brake shoe end of the lever so that it engages the wheel.

8 Claims, 4 Drawing Sheets

WHEELBARROW HAVING A HANDBRAKE

This application is related to Provisional patent application 60/077,012 filed Mar. 6, 1998.

This invention relates to a wheelbarrow having a handbrake. More specifically, this invention relates a spring-biased handbrake assembly especially adapted for installation on a wheelbarrow of either the one-wheeled or two-wheeled variety.

BACKGROUND OF THE INVENTION

The prior art includes a number of patents disclosing wheelbarrows having handbrakes. Examples are:

| Wing et al | 4,640,520 |
| --- | --- |
| Patterson | 3,950,005 |
| Michaux | 4,479,658 |
| Roessler | 2,716,031 |

SUMMARY OF THE INVENTION

The invention is a normally "on" brake assembly for a wheelbarrow having an undercarriage, the wheelbarrow having at least one wheel mounted on the undercarriage and having an axis. The assembly comprises a base plate adapted to be secured to the undercarriage and having a lever pin extending downward therefrom and a brake lever having a shoe end and a drive end, the lever intermediate its ends being pivotally mounted on the lever pin. The shoe end is formed with an aperture. A downward bracket is secured to the base plate spaced from the lever pin and has a spring-centering pin mounted thereon parallel to the base plate and directed at the shoe end of the brake lever. A shoe assembly comprises a shoe head having a stem extending outward through the aperture in the shoe end of the brake lever, and a sleeve is received onto the stem from its outward end. An annular flange is spaced inward from the outward end of the sleeve. The shoe head is adapted to engage the wheel at a position offset from the axis of the wheel. An axial spring receives from its opposite ends respectively the sleeve and the spring-centering pin, the spring disposed compressively between the bracket and the flange. Drive means are attached to the drive end of the brake lever.

BRIEF DESCRIPTION OF THE DRAWINGS

Objects and features of the invention will be clear to those skilled in the art from a review of the following specification and drawings, all of which present a non-limiting form of the invention. In the drawings.

DESCRIPTION OF THE PREFERRED EMBODIMENT

Figure 1:
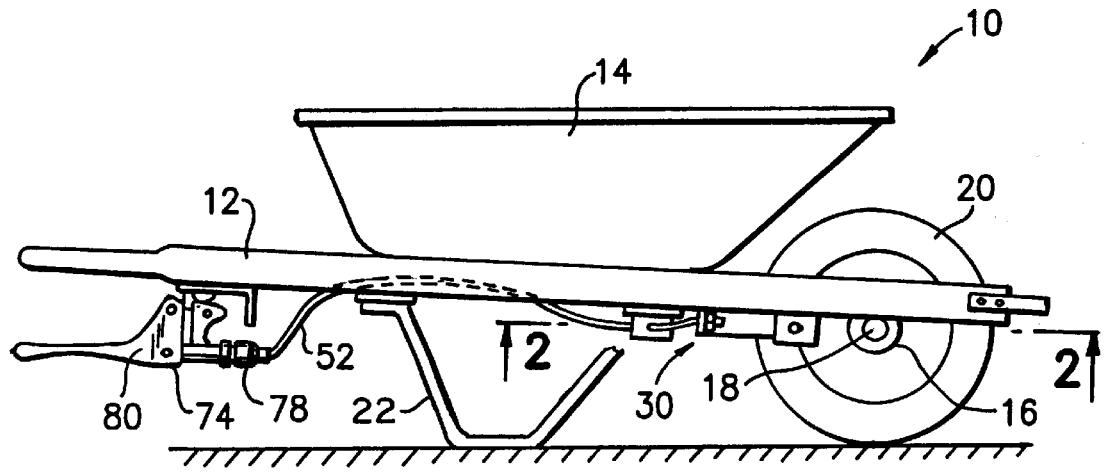
FIG. 1 is a side view of a one-wheeled wheelbarrow incorporating the handbrake assembly of the invention.

A wheelbarrow embodying the invention is shown in FIG. 1 and designated 10. It comprises an undercarriage defined by a pair of beams 12 upon which rests a pan 14. Mounted near the front ends of the beams 12 are a pair of aligned brackets 16 which journal a shaft 18 on which is mounted a wheel 20. A pair of legs 22, one on each beam 12, support the rear end of the wheelbarrow.

Figure 3A:
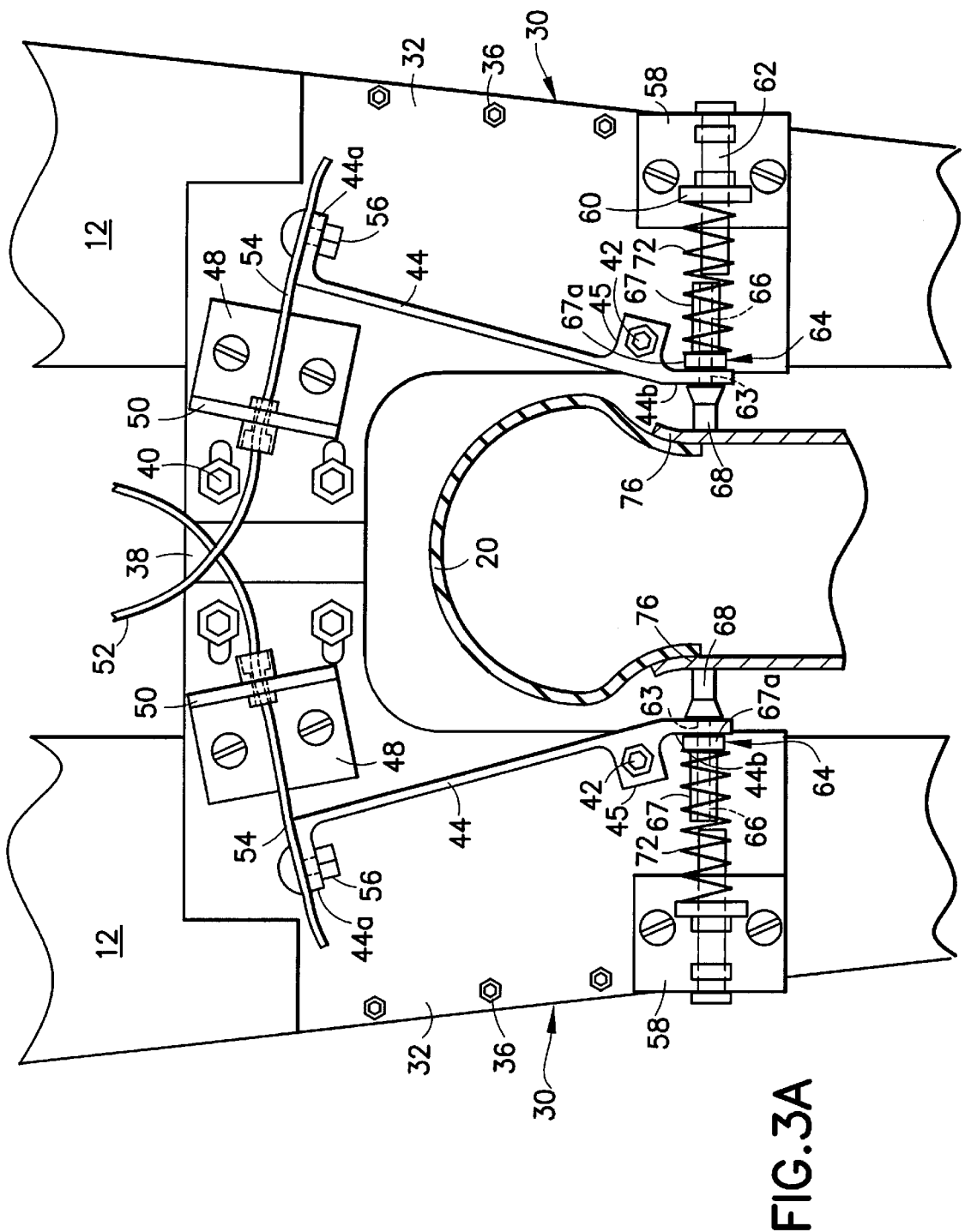
FIG. 3A is an enlarged view of a portion of FIG. 2.

In this embodiment there are a pair of assemblies. Each hand brake assembly is generally designated 30. Each assembly comprises a base plate 32 which is formed with suitable apertures by which they are secured to the respective beams 12 by bolts 36 (FIG. 3A). Toward the center line of the wheelbarrow the plates 32 of the two assemblies are also apertured and bolted to a tieplate 38 by bolts 40. A downward pivot pin 42 is welded to each of the plates and the pins pivotally mount respective brake levers 44. Each brake lever comprises a drive end 44a and a brake shoe end 44b (FIG. 3A) and are formed intermediate their ends with ears 45 having suitable apertures 46 receiving the pins 42 respectively so that the brake levers pivot on the pins.

The plates 32 of the assemblies are each also provided with clips 48 bolted thereto and having apertured downward flanges 50 to which is clamped the sheath of a Bowden wire 52. Drive cables 54 of the Bowden wires are secured by bolts 56 to the drive ends 44a of the levers 44 respectively.

The plates 32 are also provided respectively with brackets 58, each having a downward flange 60 which is apertured, the aperture securely receiving a spring-centering pin 62. In a variation, the pin 62 may carry a spring-bottoming annulus inward of bracket flange 60 and the pin 62 may be axially adjustable in the aperture for adjusting the pressure of the spring 72.

The shoe ends 44b of the levers 44 have apertures 63 which receive shoe assemblies 64. The shoe assemblies 64 are each two pieces: a shoe head 68 having a stem 66 which slides into the aperture 63 in a direction toward the outside of the wheelbarrow. The cylindrical brake shoe head 68 is larger than the aperture and is of composition material. The second part of the shoe assembly 64 is a sleeve 67 which slides on the outward part of the stem 66 and is formed with a flange 67a (FIG. 3A) which rides against the lever. The sleeves 67 are in general alignment with the pins 62 respectively.

For each assembly, compression springs 72 receive axially from opposite ends the respective sleeves 67 and pins 62 and bear on the end 44b and flange 60. This biases the levers 44 toward the position in which the shoes engage the rim 76 of the wheel so that the brake is "on".

At their rearward ends (FIG. 1) the Bowden wires 52 are secured to ordinary bicycle hand-brake operators 74 in a manner well known in the art. Specifically, the Bowden wire sheath 52 is secured to a bracket 78 and the operating cable 54 within the sheath 52 is secured to an end of an operating actuator 80 pivoted to the bracket.

With the construction shown, the brakes are normally "on", that is, the brake shoes 68 engage the rim 76 of the wheel 20 from opposite sides. By squeezing the two bicycle-type hand brake operator levers 80 toward the handles, the user of the wheelbarrow disengages the brake shoes 68 from the rim 76 of the wheel 20, turning the brakes "off" and permitting the wheelbarrow to roll freely in the usual way.

Modification

Figure 2:
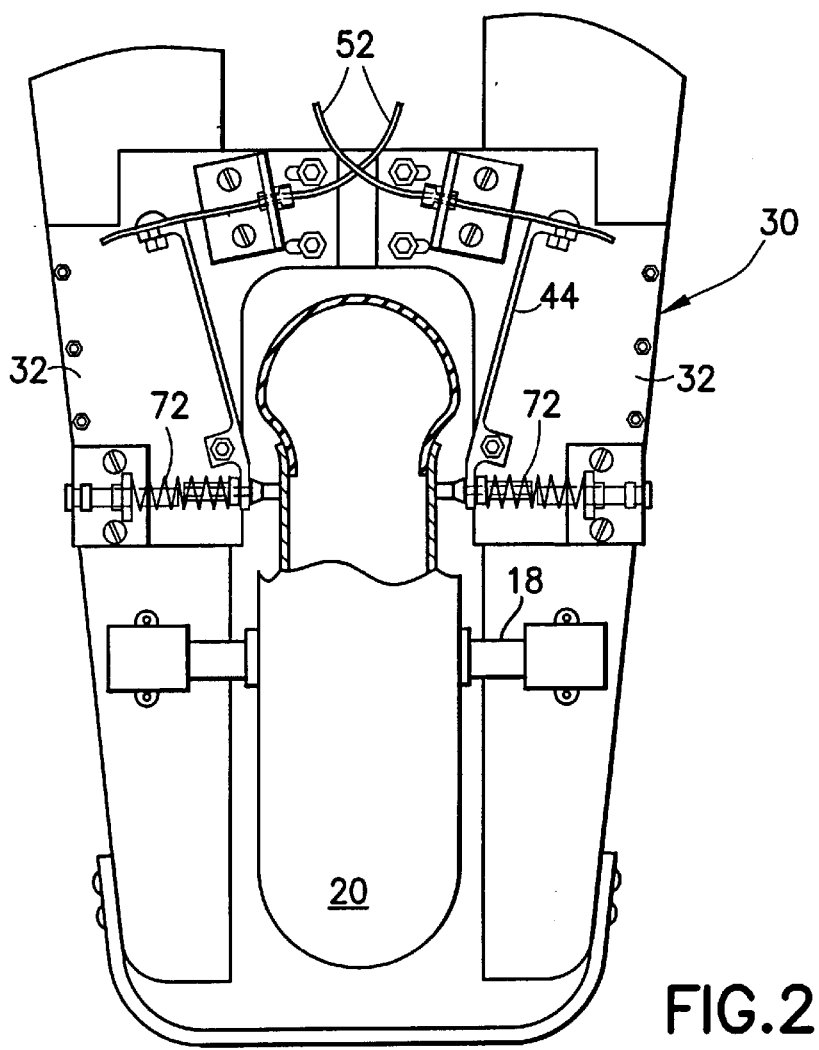
FIG. 2 is an enlarged fragmentary bottom plan view of the front end of the wheelbarrow of FIG. 1.
Figure 3B:
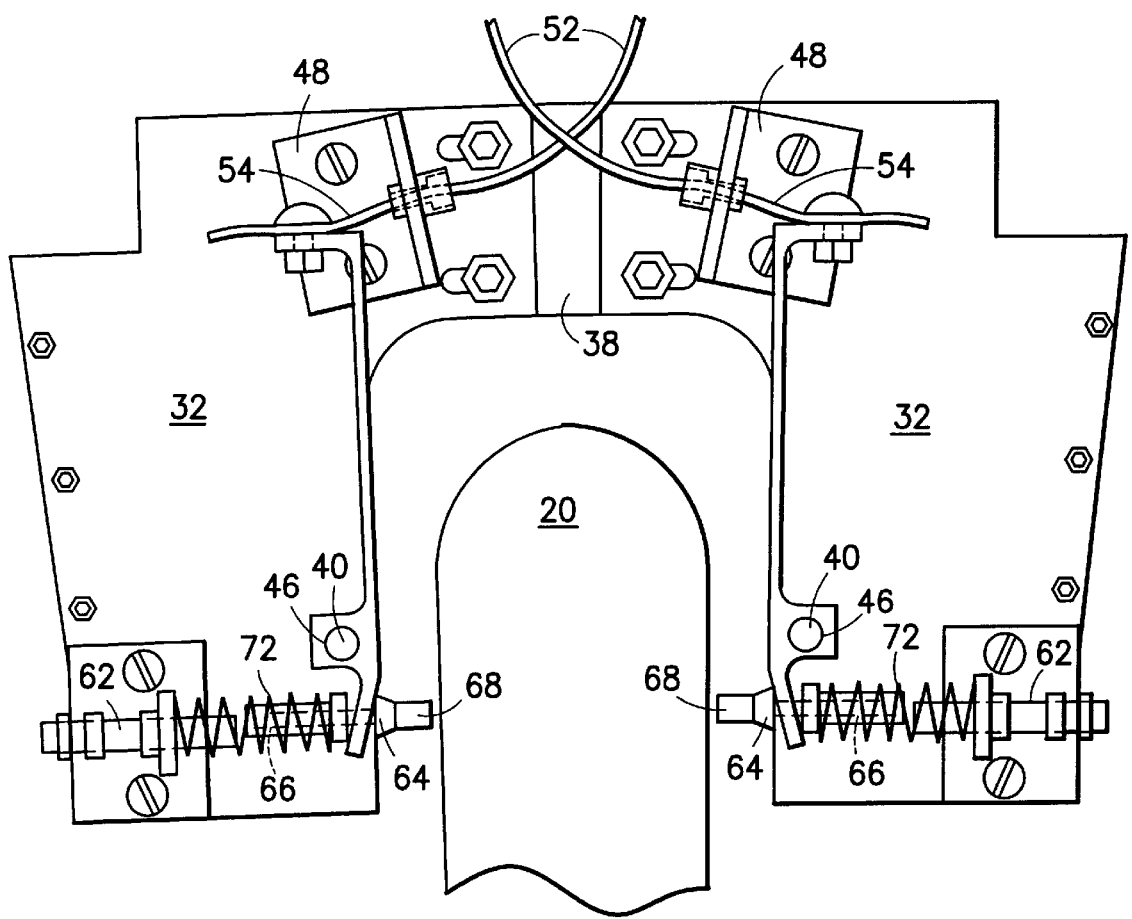
FIG. 3B is a view similar to FIG. 3A showing the brake in released position.
Figure 4:
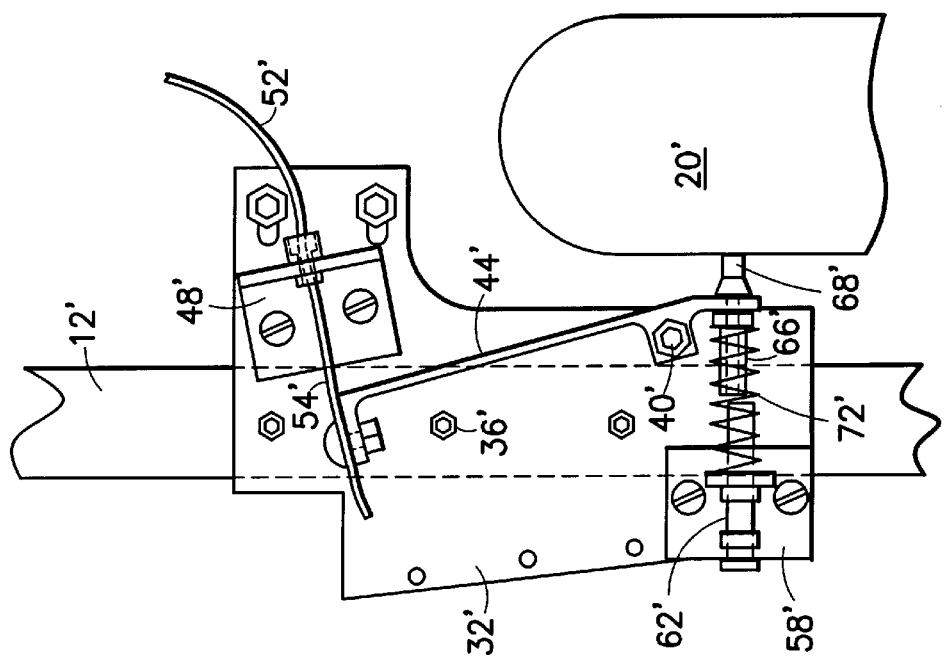
FIG. 4 is a fragmentary bottom plan view of a two-wheeled wheelbarrow incorporating an embodiment of the handbrake assembly of the invention.
Figure 4:
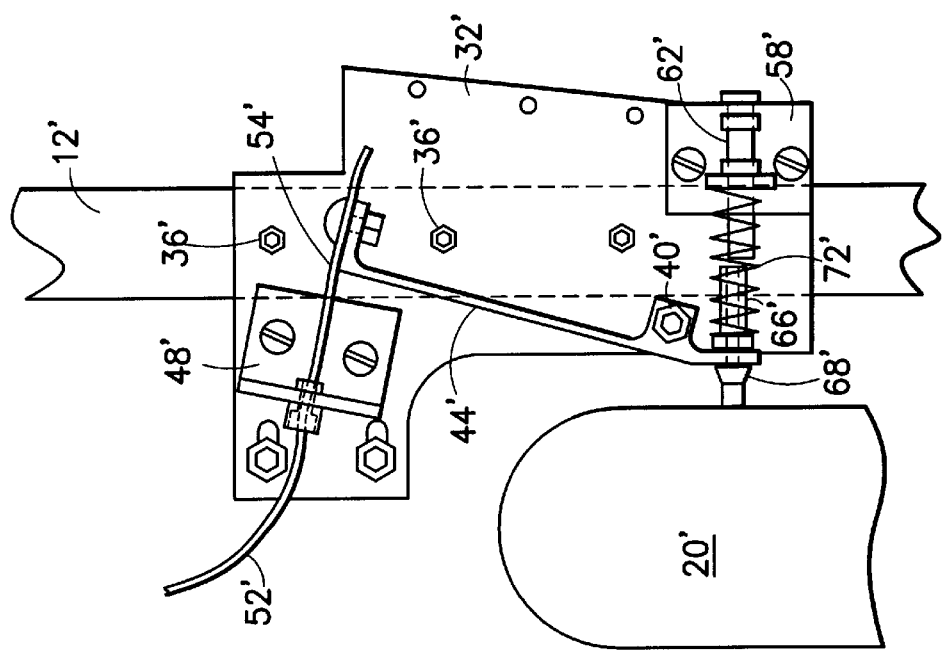

A modified form of the invention is shown in FIG. 4 wherein two brake assemblies 30' are mounted on the inside of the two wheels of a two-wheeled wheelbarrow. The shoes 68' of the brake assemblies are directed outward. The plates 32' are suitably apertured and bolts 36' hold the plates to respective beams 12'. The structure of the assemblies on each plate 32' is similar to those in the first version, and the primed form of the same reference number is applied to parts corresponding to similar parts of the brake assembly of FIGS. 2, 3A and 3B.

Variations in the invention are possible. Thus, while the invention has been shown in only one embodiment, it is not so limited but is of a scope defined by the following claim language which may be broadened by an extension of the right to exclude others from making, using or selling the invention as is appropriate under the doctrine of equivalents.

What is claimed is:

1. A normally "on" brake assembly for a wheelbarrow having an undercarriage, the wheelbarrow having at least one wheel mounted on the undercarriage and having an axis, the assembly comprising:

a. a base plate adapted to be secured to the undercarriage and having a lever pin extending downward therefrom, b. a brake lever having a shoe end and a drive end, the lever intermediate its ends being pivotally mounted on the lever pin, the shoe end being formed with an aperture, c. a bracket secured to the base plate spaced from the lever pin and having a spring-centering pin mounted thereon parallel to the base plate and directed at the shoe end of the brake lever, d. a shoe assembly comprising a shoe head having a stem formed with an inward end extending outward through the aperture in the shoe end of the brake lever, and a sleeve slidably received onto the stem from the outward end and having an annular flange spaced from the outward end of the sleeve, the shoe head adapted to engage the wheel at a position offset from the axis of the wheel, e. an axial spring receiving from opposite ends respectively the sleeve and the spring-centering pin, the spring disposed compressively between the bracket and the flange, and f. drive means attached to the drive end of the brake lever.

2. A brake assembly as claimed in claim 1 wherein the plate also mounts an L-shaped clip having a downward leg and the drive means is a Bowden wire including a sheath secured adjacent an end to the clip and an axial drive cable secured to the drive end of the brake lever.

3. A brake assembly as claimed in claim 2 wherein the Bowden wire has another end wherein the sheath is secured to a handle of the undercarriage and the drive cable is secured to an actuator pivoted to the same handle.

4. A brake assembly as claimed in claim 1 including additionally a duplicate brake assembly for mounting on the undercarriage and adapted to have its shoe engage a wheel of the wheelbarrow.

5. A brake assembly as claimed in claim 4 wherein the pair of brake assemblies engage the same wheel from opposite sides thereof.

6. A brake assembly as claimed in claim 4 wherein the wheelbarrow has two co-axial spaced wheels and the two assemblies brake the respective wheels.

7. A wheelbarrow having an undercarriage and having the brake assembly of claim 1 installed on the undercarriage.

8. A normally "on" brake assembly for a wheelbarrow having an undercarriage, the wheelbarrow having at least one wheel mounted on the undercarriage and having an axis, the assembly comprising:

a. a base plate adapted to be secured to the undercarriage and having a lever pin extending downward therefrom, b. a brake lever having a shoe end and a drive end, the lever intermediate its ends being pivotally mounted on the lever pin, the shoe end being formed with an aperture, c. a bracket secured to the base plate spaced from the lever pin and having a spring-centering pin mounted thereon parallel to the base plate and directed at the shoe end of the brake lever, d. a shoe assembly comprising a shoe head having a stem defined by an inward end extending outward through the aperture in the shoe end of the brake lever, and annular means surrounding the stem and slidable thereon and spaced from the outward end of the stem, the shoe head adapted to engage the wheel at a position offset from the axis of the wheel, e. drive means attached to the drive end of the brake lever, and f. an axial spring surrounding on opposite ends respectively the stem and the spring-centering pin, the spring disposed between the bracket and the lever and urging the shoe head into braking engagement with the wheel.

\* \* \* \* \*